United States Patent [19]
Guinet

[11] 4,317,132
[45] Feb. 23, 1982

[54] SYSTEM FOR THE DIFFUSION OF DATA

[75] Inventor: Yves M. Guinet, Rennes, France

[73] Assignees: L'Etat Francais, Represente par le Secretaire d'Etat aux Postes et Telecommunications et a la Telediffusion (Centre National d'Etudes des Telecommunication), Issy-les-Moulineaux; Establissement Public de Diffusion Dit "Telediffusion de France", Montrouge, both of France

[21] Appl. No.: 114,863

[22] Filed: Jan. 24, 1980

Related U.S. Application Data

[63] Continuation of Ser. No. 911,354, Jun. 1, 1978, abandoned.

[30] Foreign Application Priority Data

Jun. 3, 1977 [FR] France .............................. 77 17625

[51] Int. Cl.³ ............................................... H04N 7/08
[52] U.S. Cl. .................................................... 358/142
[58] Field of Search ..................... 358/11, 12, 140–142

[56] References Cited

U.S. PATENT DOCUMENTS 4,058,830 11/1977 Guinet et al. ......................... 358/86
4,196,447 4/1980 Dalke .............................. 358/140 X

*Primary Examiner*—Aristotelis M. Psitos
*Attorney, Agent, or Firm*—Laff, Whitesel, Conte & Saret

[57] ABSTRACT

In a system for broadcasting data in combination with a television signal, the emitting station broadcasts, sets (blocks) of data which may be in-coming from several paths, the sets of data being time multiplexed. The present invention makes it possible to use the same television broadcast system, regardless of the television standards which may be used, with a minimum of modifications in the conventional television receivers. The frequence of the binary elements used to transmit data is made to vary as a function of the band width of the television signal which in turn, corresponds to the TV broadcast used in the area where the data is broadcast.

2 Claims, 5 Drawing Figures

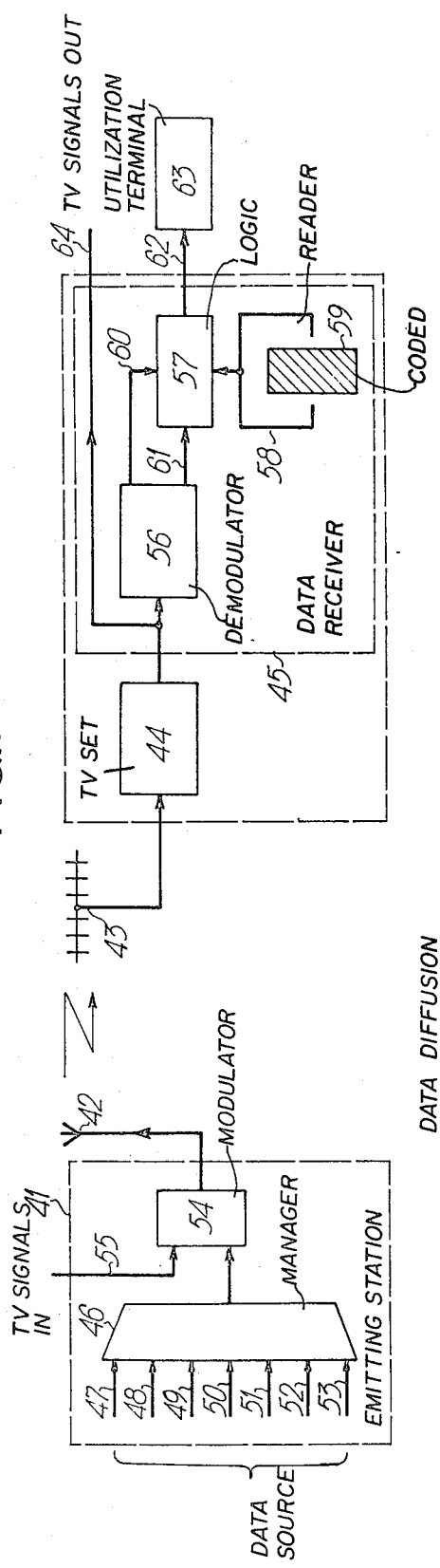

SYSTEM FOR THE DIFFUSION OF DATA

This is a continuation of application Ser. No. 911,354, filed June 1, 1978 and now abandoned.

The present invention relates to modifications, changes and improvements in the unidirectional transmission system of data described in French Patent Application No. 75 18319, filed on June 6, 1975; U.S. application Ser. No. 689,493, filed June 3, 1976, now U.S. Pat. No. 4,058,830; and, especially in such a system making use of standarized Hertzian infrastructures of television systems.

In the unidirectional transmission system or data diffusion (system) according to the above-mentioned French application, the data transmitted are arranged in sets (blocks). Each set has, at most, the active duration of a television image line. The sets are inserted either in place of the image signals, or in return lines of the grid, between a convention synchronization signals of television lines.

In the transmission systems of a type, which has known before the one described in the above mentioned patent application, during the active duration of each line, the informations relative to the text appears on the screen of the receiver. In order to use a reduced number of lay-out means, there is a biunivocally correspondence between the location of an information during the active duration, and its location on the line of writing particular to the television screen. In addition to the constraints (limitations), those provisions impose respectively upon the operation of lay-out of the documents, before they are transmitted. The exploitation of data takes place as they arrive. A rigid relationship exists between the interval covered by a character on its writing line and the time interval occupied by the corresponding data contained in the time interval of the active duration of the transmitted line. This explains, for a given modulation standard, such as, for example, the modulation with "non-return to zero", a frequency of binary elements which is directly related to the number of characters per line of writing. When that number, which is a function of the clarity of the character on the television screen, is the object of a standard, the frequency of the binary elements is thus frozen, without any relation to the norm or standard used for the diffusion of the television signals. At the limit, it may prove incompatible with the running band assigned to the television emitters of the system. It is known, besides, that the standardized widths of running bands, in the various countries, are in effect very different, ranging from 6.0 MHz in France, to 4.2 MHz in the U.S., this indicating that the above-mentioned incompatibility may occur in practice.

One object of the present invention comprises providing for a data diffusion system which a simple means make it possible, in all cases, to avoid the incompatibility.

Another object of the present invention further comprises providing for such a derived system by means of a simple modifications of the system described in the afore-mentioned Patent Application No. 75 18319 (U.S. Pat. No. 4,058,830).

Moreover, the French Patent Application No. 76 27212, filed on Sept. 6, 1976, in the joined names of l'Etablissement Public de Diffusion called "Telediffusion de France", Miss De Marouille and Mr. Fournier, describes a system for the transmission and the posting of texts on a television screen, in which an emitting station diffuses sets of data coming from several paths. These signals are multiplexed over time, the whole of the sets from one path constituting a magazine formed of several pages. The data of one page begins with a page flag. The data of each page is grouped in rows (or page line). The data of each row is preceded by a row flag, followed by the number of the row, and followed by a row flag. The row number detected after each row flag defines the address at which the data of the row must be stored in a memory. French Patent Application No. 76 29034 filed on Sept. 22, 1976, describes a system for posting the data of the rows which have been stored in the above-mentioned memory, using a character generator which feeds a posting device with a television screen.

It must be well understood that by using a row flag per row, it becomes possible to diffuse the sets of data in one sweep line without same corresponding to the row number in which the data are posted.

Another object of the present invention comprises providing for a data diffusion system which uses the above-indicated possibility. There are means to pass from a television channel in one standard to another channel in another standard.

In the data diffusion system according to the main patent application, the emitting station diffuses, in the form of sets, numerical data coming from several paths, the sets of the different paths being multiplexed over time. Each set comprises a prefix containing, in addition to conventional synchronization signals, and path identification code signals, a set size signal which indicates the length of the succession of data which follow the prefix.

The emitting station comprises as many coupling devices as their are paths. Each coupling device comprises an input circuit, the input of which is connected to the output of the path associated with the coupling device, and the output of which may be connected to a multiplexing circuit under control of a common governing circuit for all of the coupling devices. Each coupling device further comprises a counter fed at a predetermined rhythm. The inhibition order of the input circuit is given either as soon as the memory is full, or as soon as the counter has reached a pre-determined count, the size signal introduced into the set prefix having the value of the content of the memory at the time of the inhibition order.

When the multiplexing circuit is free, the governing circuit can connect the memory to the multiplexing circuit. Then the memory is emptied, the counter is set back to zero, and the inhibition order is removed. The pre-determined rhythm of the counter is set as a function of the speed of operation of the receiving equipment.

In the receiving equipment, the signals which follow the prefix, when said equipment accepts it, are sent into a buffer memory, the output of which is connected to an output circuit. The receiving equipment further comprises a size signal register which stores the size signal of the prefix of each set received. A counter is fed by a clock signal at the frequency of the binary elements of the data. Once it has reached its maximum count, the counter causes an emptying of the succession (series) of the first data which have entered the buffer memory, toward the output circuit. The length of the series is determined by the value registered in the size register, the following signals remaining non-utilized.

According to a characteristic of the present invention, there is provided, in the emitting station, a register which counts the data introduced into the data memory. The register has a maximum capacity which is adjustable as a function of the standard of the telediffusion network through which the data are diffused. The register causes the inhibition order of the input circuit when the count of the data reaches the maximum capacity.

According to another characteristic, the counter of the reception equipment is fed by the clock signal at the frequency of the binary elements, and has an adjustable maximum capacity, equal to that of the register of the emitting station, the adjusting of the maximum capacity being directly performed by the television channel switch.

According to another characteristic, the circuit for the recovery of the frequency of the binary elements of the receiving equipment comprises a tuned circuit which includes an adjustable impedance component, the value of which is adjusted (set) directly by the position of the television channel switch.

According to another characteristic, the impedance component which is adjustable is a varicap.

The characteristic of the present invention which have been mentioned above, as well as others, will appear more clearly upon reading of the following description of one example of execution, the description being given respective to the attached drawing in which:

FIG. 1 represents the block-diagram of a data diffusion system in which there are incorporated the improvements according to the present invention.

FIG. 2 is a diagram of data sets, making it possible to illustrate the operation of the system in FIG. 1.

FIG. 3 is the diagram of a particular set of data, shown as an example.

This application is an improvement over the system shown and described in U.S. Pat. No. 4,058,830; particularly compare patent FIG. 3, with FIG. 4 herein. To assist in making this comparison the corresponding parts are interrelated, as follows:

Figure 4:
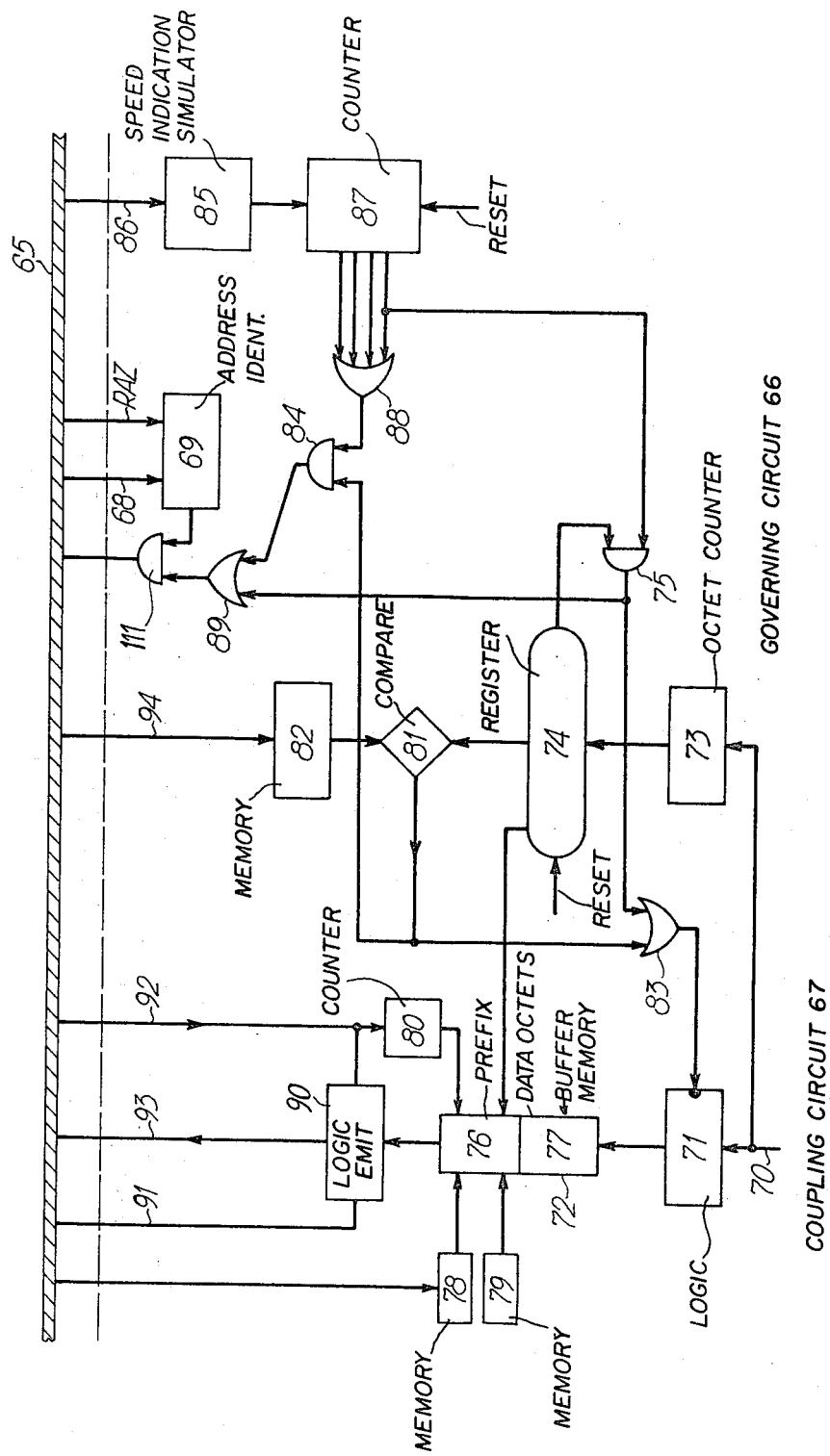
FIG. 4 is a block-diagram of the logical part of the emitting equipment.

| Reference Numeral Herein | Patent Reference Numeral |
| --- | --- |
| 70 | 101 |
| 71 | 103 |
| 72 | 104 |
| 73 | 107 |
| 74 | 108 |
| 75 | 110 |
| 76 | 111 |
| 77 | 112 |
| 78 | 97 |
| 79 | 113 |
| 80 | 114 |
| 81 | 115 |
| 82 | 116 |
| 84 | 117 |
| 85 | 118 |
| 86 | 119 |
| 87 | 120 |
| 88 | 121 |
| 89 | 122 |
| 90 | 123 |

The data diffusion system according to FIG. 1 comprises an emitting station which includes an emitting equipment 41, and a telediffusion antenna 42, as well as several subscriber receiving sets comprising a reception antenna 43, a television set (receiving set) 44, and a data receiving equipment 45.

The emitting equipment 41 comprises a unit 46 called the "manager", which is responsible for multiplexing, over time, the data messages coming from several sources of data which, in the example here described, is supposed to be limited to 7 sources, 47 to 53. Equipment 41 comprises, also, a modulation part 54 which received for one part the signals transmitted by the "manager" and, for the other part, video signals, received through a connection 55, and which transmits signals to a conventional transmitter, not shown, which feeds antenna 42. As an example, the description of a modulation part 54, will be found which does not constitute a part of the present invention, in the above-mentioned French Patent Application No. 75 18319 and, especially in FIG. 4 thereof.

The data transmitted by the "Manager" circuit 46 are arranged in sets. In modulation part 54, the sets are inserted in lieu of the image signals, between the conventional synchronization signals of the television lines.

FIG. 2 shows an example of sets of data transmitted by the "Manager" circuit 46, and then after modulation by antenna 42.

The set has a maximum length of Nmax octets, numbered from 1 to Nmax, and it is composed of two parts. The first part, called prefix, is prepared under control of the "Manager" circuit 46, and it is constituted by the first eight octets, 1 to 8. The second part, constituted by octets 9 to Nmax, constitutes the data themselves of the set. The Nmax number may vary, depending on the standard of the diffusion network ensuring the diffusion, and which may be determined by optimization, taking into account the length of the useful television line, and of the running band. Thus, in the French standard with 625 lines for, example Nmax may reach 32, which corresponds to the L standard recommended by the CCIR. In the U.S. standard, with 525 lines, taking into account the limited running band, Nmax<32.

In the prefix, the two octets 1 and 2 are reserved for the synchronization of the binary elements of the set. They are each formed, for example, by the binary element sequence 10101010. Octet 3, called the "beginning", conventionally makes it possible to perform the synchronization, octet by octet, and it may correspond to the sequence 11100111. Octets 4, 5 and 6 are reserved for the identification of the service, and they are worked out in coded form by the "Manager" circuit 46. Octet 7 called a continuity octet, makes it possible to count the numbers or indices of sets 1 to 127 and therefore to give an account of any omission of set or of errors in the receiving equipment. Finally, octet 8 indicates the size of the set, that is to say, when a set does not contain the number Nmax of octets, the number of the last octet having a meaning. (This is similar to the response to the final octet 8 which is described in col. 4, lines 43-45 of U.S. Pat. No. 4,058,830).

As an example, FIG. 3 shows a set comprising only three octets of useful data, 9 to 11, in which octet 8 has the value 3.

It must be well understood that the standard used makes it possible to choose the Nmax number of the octets which can be transmitted in a line, as well as the binary element frequency which, in a modulation standard of the 'non-return-to-zero' type, is simply deduced from the 1010 . . . sequences of octets 1 and 2. In addition, the set size octet makes it possible to render transmission in an independent from the sets on television lines, and makes possible the posting of the rows of characters on a television receiver screen.

With reference again to FIG. 1, the television receiver 44 transmits through its video output, the video signals of equipment 45. The latter comprises a demodulation part 56, a logical part 57 and a reader 58 of a coded support 59. Demodulation part 56 delivers to 57 a signal of binary element frequency (ebs) through wire 60, and the last $(N-3) \times 8$ bits of the set of N octets through 61. The informations read by reader 58 are permanently applied to logic circuit 57.

As to the part part played by coded support 59, it will be useful to go back to the main patent application (now U.S. Pat. No. 4,058,830). The receiving part 57 (FIG. 1) delivers over wire 62 the octets of the set's data, to a suitable terminal such as 63, while the video signal delivered by 44 still is available in 64. FIG. 3 shows an omnibus line 65, a governing circuit 66 and one of a number of couplings 67 which connect sources 47 to 53, to line 65 (the governing circuit is identified by the reference numeral 76 in FIG. 3 of U.S. Pat. No. 4,058,830).

In practice line (wire) 65, the governing circuit 66 and coupling devices 67 constitute the "Manager" circuit 46, FIG. 1. The governing circuit 66 is connected to bus 65 and it can order the coupling devices to become connected to bus 65. The governing circuit shall not be described in more detail, because it is assumed to be identical with circuit 76 in FIG. 3 of the main patent application (U.S. Pat. No. 4,058,830). It will only be recalled that this governing circuit 66 emits in the form of addresses, questions toward the coupling devices, in order to collect the identities of the coupling devices which are ready to emit, then it emits in succession orders of transmission toward those coupling devices.

In coupling device 67, the questions (interrogations) coming from the governing circuit enter through connection 68 connected to an address identification circuit 69 which comprises components 90, 92 and 126 in FIG. 3 of the main patent application (U.S. Pat. No. 4,058,830). Circuit 69 has its output connected to the first input of an AND gate 111, the output of which is connected to bus 65. (Compare the circuit 111 operation herein with the operation of gate 95 in U.S. Pat. No. 4,058,830, col. 7, lines 35 et seq.)

The data coming from the source associated with coupling device 67 are transmitted by a juncture device 70 of the type described in French Patent Application No. 74 13136 filed on Apr. 16, 1974, in the joined names of the applicants, and the title of which is: "A Device for Standardized interface for communications". Through juncture device 70, the data enter in parallel octets into an input logical circuit 71 the output of which is connected to a data buffer memory 72. Besides, the "going" service line of the connection 70, which transmits a change of state for each octet transmitted by 70, is connected to the input of an octet counter 73 the output of which is connected to a register 74 containing the number of octets transmitted by logic circuit 71 to buffer memory 72. Register 74 has a 'set-back-to-zero' (RAZ) or reset input, connected to line 65, an output connected to the first input of an AND gate 75, and an output connected to memory 72. (This is the same as the reset of register 108 described in col. 6, lines 49-52 of U.S. Pat. No. 4,058,830).

Buffer memory 72 comprises two parts, one of them, 76, in which there are registered the set prefix octets, and the other, 77, in which there are registered the data octets coming from the source through logic 71. Part 76 has a first input connected to a memory 78 which contains synchronization and beginning octets 1 to 3, a second input connected to a memory 79 which contains the three octets 4 to 6 of identification of each set prefix, a third input connected to a set counter 80, which delivers the number of the set, that is to say the continuity octet, and a fourth input connected to register 74 which delivers, at the time of transmission, the count of the octets contained in part 77, that is to say the size octet.

An output of register 74 is also connected to the first input of a comparing device 81 and second input of which is connected to the output of a memory 82 containing the (Nmax−8) number, which corresponds to the maximum number of data octets which can be transmitted in one set. The output of 81 is connected, for one part, to an input of an OR gate 83 and, for the other part, to the first input of an AND gate 84. The output of OR gate 83 is connected to a circuit inhibition input 71.

Coupling device 67 further comprises a simulation circuit 85, which receives a speed indication coming from the governing circuit through bus 65, and a connection 86. The speed indication depends on the speed of operation of the receiving equipments capable of receiving the data from the source associated with the coupling device. With that speed information, simulator 85 simulates an emptying of buffer memory 72, the emptyings being counted in a counter 87 connected to the output of 85. Outputs 1 to 4 of counter 87, correspond to counts 1 to 4, and are connected to the inputs of an OR gate 88 the output of which is connected to the second input of the AND gate 84. Moreover, output 4 of counter 87 is connected to the second input of AND gate 75. The outputs of AND gates 84 and 75 are connected to the inputs of an OR gate 89 the output of which is connected to the second input of AND gate 111. The output of AND gate 75 is connected, also, to an input of OR gate 83. (This is similar to the blocking of logic circuit 103 which is described in col. 7, lines 21-24 of U.S. Pat. No. 4,058,830).

The output of memory 72 is connected to a logical emission circuit 90 which receives from bus 65, through connection 91, the frequency signal of the binary elements and, through connection 92, the emission order coming from the governing circuit. The output of the logical emission circuit 90 is connected to line 65 through wire 93 which transmits in series, bit by bit, the set toward the modulation part of the emission equipment. Connection 92 also is connected to the input of counter 80 which thus can count the sets emitted by coupling device 67.

The operation of coupling device 67 is practically the same at that of coupling 77 in FIG. 3 of the main patent application (U.S. Pat. No. 4,058,830), where there are moreover found the same components with the exception of memory 82 which, instead of containing number 32, contains the number (Nmax−8). Indeed, as it has been seen above, the Nmax number varies as a function of the standard of the telediffusion network. In the French standard with 625 lines, the running band of the video signal is 6 MHz, this making it possible, within the nominal duration of a 64 microsecond line, to place 40 octets. That is why, in the main French Patent (U.S. Pat. No. 4,058,830), there is a memory containing the number 32. According to the present invention, provisions are made for the number Nmax, which must be capable of varying. That is why connection 94 is provided between line 65 and memory 82, thus making it possible to modify the content of 82 from the governing circuit.

It must further be noted that the operator of the source associated with the coupling device always transmits only significant data, and that he does not have to worry, either regarding the Nmax number, or regarding the transmission frequency of the binary elements which circuit 66 can also govern through wire 91.

Figure 5:
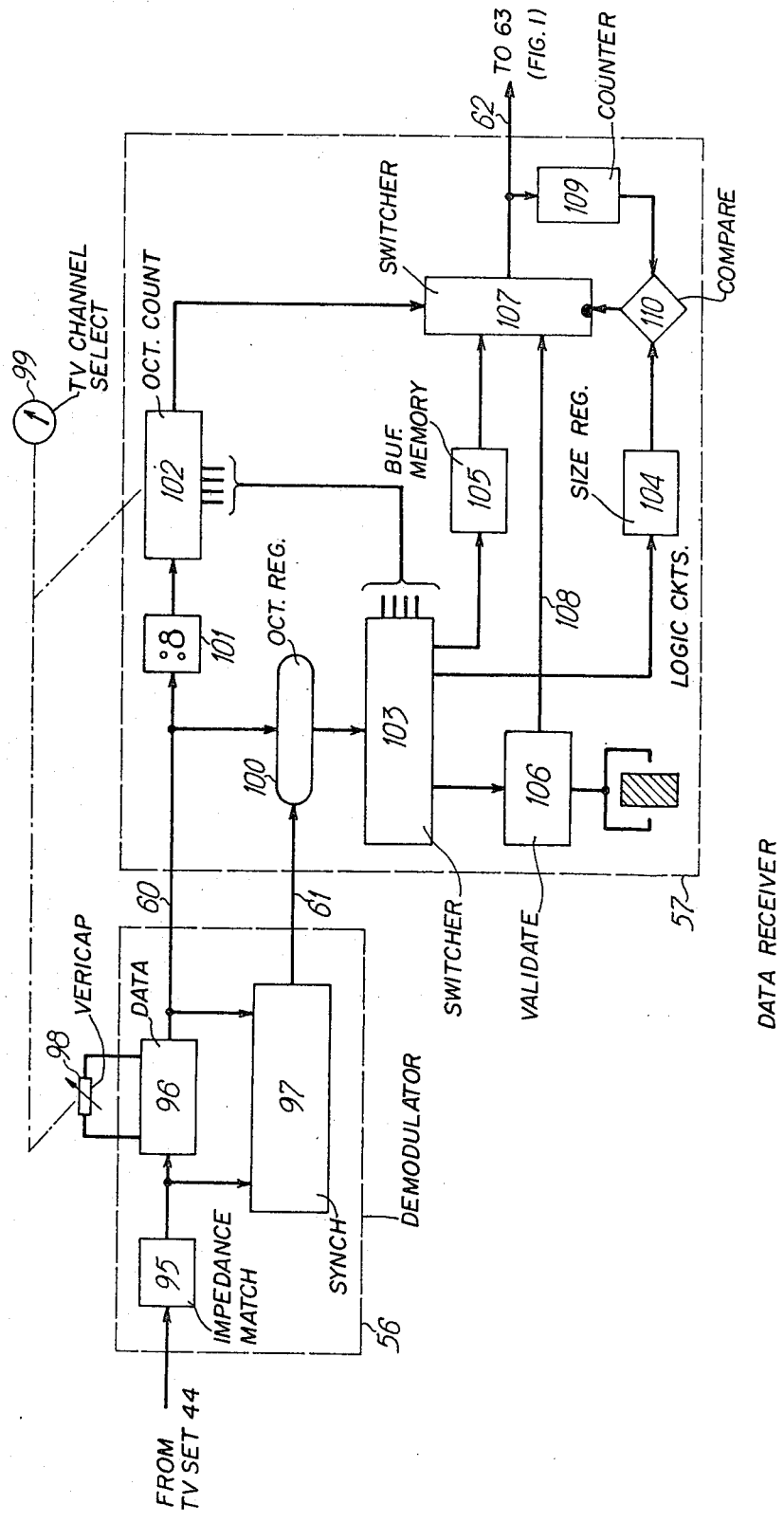
FIG. 5 is the block diagram of a data-receiving equipment.

The demodulation part of the receiving equipment of a subscriber is shown in FIG. 5. The video signals coming out of television receiver 44 (FIG. 1) are applied to an impedance adaptation circuit 95 the output signal of which is applied, for one part to the circuit 96, for the recovery of the frequency of the binary elements and, for the other part, to a synchronization circuit 97. Synchronization circuit 97 comprises the circuits bearing the numerical references 152 to 161 in FIG. 5. of the main patent application (U.S. Pat. No. 4,058,830). Circuit 97 recognizes, especially the 'beginning' octet, so that it will transmit to the logical part 57, through connection 61 which corresponds to connection 65 in the main patent application (U.S. Pat. No. 4,058,830), only the fourth and following octets of each set. Citcuit 96 comprises, as do the classical circuits for the recovery of the binary element frequency, a tuned circuit comprising a component 98 with variable impedance, which may be a vericap, the impedance of which is governed by the television channel selector 99. Circuit 96 delivers the signal at the frequency of the binary elements, for one part to the synchronization circuit 97 and, for the other part, to circuit 57 through connection 60.

In circuit 57, the signal having the frequency of the bits is applied, for one part to an octet register 100 and, for the other part, to a divider-by-eight 101, the output of which is connected to the input of an octet counter 102 which is adjusted by channel select knob 99. The bits of the set are applied by wire 61, in series, to the data input of octet register 100 which transmits the octets in parallel to a switching circuit 103. Octet counter 102 has its first six outputs corresponding to the first six octets received in logic circuits 57, that is to say to octets 4 to 9, connected by governing inputs of circuit 103, the successively activated inputs of which have to orient in succession the octets of the set toward the validation circuit 106 for octets 4, 5, 6 and 7, toward a size register 104 for octet 8, and toward a data buffer memory 105.

Validation circuit 106 may include circuits 168, 179, 166, 171, 167 shown in FIG. 6 of the main patent application (U.S. Pat. No. 4,058,830) and, possibly, the circuits 173 and 174 of that application.

The output of buffer memory 105 is connected to the input of a switching circuit 107 which may be activated by a connection 108 coming from the validation circuit 106. The output of switches 107 is connected to a juncture device 62, of the type of juncture device 70 in FIG. 4, which is connected to the utilization equipment terminal 63. A wire of juncture device 62 is connected to the input of a counter 109 which counts the octets transmitted by switches 107. The output of counter 109 is connected to an input of a comparing device the other input of which is connected to the output of the size register 104, and the output of which is connected to an inhibition input of circuit 107. Finally, the output of octet counter 102 is connected to a validation input of circuit 107.

Octet counter 102 activates its output when it has reached the Nmax count. At that point, buffer memory 105 has received Nmax octets of which possibly only N octets of sets are valid, N representing the size of a set. Assuming that circuit 106 does validate the set, as soon as the counter 102 validates its output, the octets may be transferred from buffer memory 105 to wire 62 through switches 107. As soon as N octets have thus been transferred, the inputs of comparing device 110 have values which are equal. The output of circuit 110 forbids any other transmission from buffer memory 105 to wire 62 for the television line under consideration which serves as support for the set.

Counter 102 has several outputs which can be activated, corresponding to several possible values of Nmax, one of those outputs possibly being chosen by means of the television channel selector 99, that it changes the same time as the value of varicap 98 (i.e. selector knob 99 adjusts the receiver to conform to the selected channel $N_{max}$.)

Thus it seems that with very simple means, a varicap and a counter output selector, the receiver can be immediately adapted to the reception of data, whatever may be the standard of the data diffusion network.

The treatment equipment may be of the type described in the already mentioned French Patent Application No. 76 27212, which makes possible the posting of characters, the positions of which on the screen are determined by page and row flags, independently of the position of the octets in the respective television lines which have served to transmit them.

We claim:

1. A system for broadcasting sets of digital data through a television broadcasting network having transmission standards which are set by a regulatory agency, the system comprising a plurality of sources of said digital data; each set of said digital data comprising a prefix, synchronism signals which are conventional for the TV network used to broadcast the digital data, an identification signal of the pertinent source of said data, and a size signal identifying the length of the data signal which follows the prefix, memory means and a coupling means individually associated with each source of data for transferring data from the associated source to said memory means, means governing said coupling means for assembling data from said source, counter means operating at a predetermined clock rate for selectively inhibiting said coupling means responsive to either a predetermined count fixed by said size signal or a full count fixed by the capacity of said counter means, data bus means, means responsive to said inhibition by said counter means for enabling said memory means to transfer its stored data to said data bus means, said data bus means combining said assembled data, first register means for controlling data introduced into said memory means, said register means having a maximum capacity which is a function of the transmission standards of said network, and means responsive to said first register means for controlling said inhibition by said counter means, whereby said data-broadcasting system is coordinated with the transmission standards of said network by the capacity of said first register means.

2. The system of claim 1 and receiver means for picking up signals broadcast by said television network, means for separating said picked-up signal responsive to said prefix, buffer memory means for storing said separated signals identified by said prefix, said first register means comprising a size signal register means for storing said size signal responsive to said prefix, clock-controlled counter means responsive to said stored size signal for periodically emptying said memory means, and means for adjusting the capacity of said clock-controlled counting means to correspond to the capacity of said first register means, thereby coordinating said receiver to said transmission standards.

* * * * *

UNITED STATES PATENT AND TRADEMARK OFFICE
CERTIFICATE OF CORRECTION

PATENT NO. : 4,317,132
DATED : February 23, 1982
INVENTOR(S) : YVES M. GUINET

It is certified that error appears in the above—identified patent and that said Letters Patent is hereby corrected as shown below:

Col. 3, Line 24, "characteristic" should be --characteristics--;

Col. 5, Line 14, delete "part" (second occurrence);

Col. 5, Line 26, after "circuit" delete "66":

Col. 7, Line 27, "Citcuit" should be --Circuit--;

Col. 7, Line 46, after "connected" "by" should be --to--;

Col. 7, Line 59, "switches" should be --switcher--;

Col. 7, Line 64, "switches" should be --switcher--;

Col. 8, Line 10, "switches" should be --switcher--.

IN THE ABSTRACT:

Line 8, "frequence" should be --frequency--.

Signed and Sealed this

Eleventh Day of May 1982

[SEAL]

Attest:

GERALD J. MOSSINGHOFF

Attesting Officer    Commissioner of Patents and Trademarks